(12) United States Patent
Weinert et al.

(10) Patent No.: US 8,562,775 B2
(45) Date of Patent: *Oct. 22, 2013

(54) COATINGS DERIVED FROM POLYESTERS CROSSLINKED WITH MELAMINE FORMALDEHYDE

(71) Applicant: OMNOVA Solutions Inc., Fairlawn, OH (US)

(72) Inventors: Raymond J. Weinert, Macedonia, OH (US); Guillermina C. Garcia, Copley, OH (US); James E. Robbins, Twinsburg, OH (US); Martin J Fay, Orwigsburg, PA (US)

(73) Assignee: OMNOVA Solutions Inc., Fairlawn, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,392

(22) Filed: Dec. 7, 2012

(65) Prior Publication Data

US 2013/0092313 A1 Apr. 18, 2013

Related U.S. Application Data

(60) Division of application No. 12/799,984, filed on May 6, 2010, now Pat. No. 8,460,497, which is a continuation of application No. 10/492,572, filed as application No. PCT/US03/07300 on Mar. 5, 2003, now Pat. No. 7,727,436, which is a continuation-in-part of application No. 10/267,061, filed on Oct. 8, 2002, now abandoned, and a continuation-in-part of application No. 10/091,754, filed on Mar. 6, 2002, now abandoned, which is a continuation-in-part of application No. 09/698,554, filed on Oct. 27, 2000, now Pat. No. 6,686,051, said application No. 10/267,061 is a continuation-in-part of application No. 09/698,554, which is a continuation-in-part of application No. 09/384,464, filed on Aug. 27, 1999, now Pat. No. 6,383,651, which is a continuation-in-part of application No. 09/244,711, filed on Feb. 4, 1999, now Pat. No. 6,423,418, which is a continuation-in-part of application No. 09/035,595, filed on Mar. 5, 1998, now abandoned.

(51) Int. Cl.
*B29C 51/14* (2006.01)

(52) U.S. Cl.
USPC ........................................... 156/212

(58) Field of Classification Search
USPC ........................................... 156/212
See application file for complete search history.

(56) References Cited

U.S. PATENT DOCUMENTS 7,727,436 B2 * 6/2010 Weinert et al. ................ 264/134

* cited by examiner

*Primary Examiner* — Michael Orlando
*Assistant Examiner* — Daniel Lee
(74) *Attorney, Agent, or Firm* — Zollinger & Burleson Ltd.

(57) ABSTRACT

A coating composition is based on a polyester mixed with an alkyl-etherified melamine formaldehyde. The coating composition is partially cured in a first stage to provide a thermoformable partially cured, tack-free, non-blocking, coating layer, followed by application to generally a contoured substrate and thermoforming to conform thereto. The contoured partially cured coating layer is then heat cured to form a cured coating. A hydroxyl-terminated polyoxetane containing repeat units derived from oxetane monomers having one or two pendent —$CH_2$—O—$(CH_2)_n$—Rf groups, wherein Rf is partially or fully fluorinated, can be esterified with polyester-forming reactants to form a fluorinated polyoxetane-modified polyester.

18 Claims, No Drawings

COATINGS DERIVED FROM POLYESTERS CROSSLINKED WITH MELAMINE FORMALDEHYDE

CROSS-REFERENCE TO RELATED APPLICATIONS

This application is a division of U.S. patent application Ser. No. 12/799,984 (now issued as U.S. Pat. No. 8,460,497), which is a continuation of U.S. patent application Ser. No. 10/492,572 (now issued as U.S. Pat. No. 7,727,436), which is a national stage entry of international patent appl. no. PCT/US03/07300, which was a continuation-in-part application of U.S. patent application Ser. Nos. 10/091,754 and 10/267,061 (both now abandoned), which are continuation-in-part applications of U.S. patent application Ser. No. 09/698,554 (now issued as U.S. Pat. No. 6,686,051), which is a continuation-in-part application of U.S. patent application Ser. No. 09/384,464 (now issued as U.S. Pat. No. 6,383,651), which is a continuation-in-part application of U.S. patent application Ser. No. 09/244,711 (now issued as U.S. Pat. No. 6,423,418), which is a continuation-in-part application of U.S. patent application Ser. No. 09/035,595 (now abandoned), the disclosures of which are incorporated herein by reference.

BACKGROUND OF THE INVENTION

This invention pertains to thermoformable coatings applied to substrates, and more particularly to typically two-stage heat curable coatings applied to thermoformable substrates such as plastics. The coating is partially cured in a first stage to form a thermoformable coating layer adhered to the substrate and heat-cured in a second stage to additionally cure the coating and provide a hard surface coating on an article having a desired configuration.

More specifically, in a first embodiment this invention relates to fluorinated polyoxetane-polyester polymers containing polyoxetane derived from polymerizing oxetane monomers having partially or fully fluorinated pendent side chains. Poly-oxetane-polyester polymers have many of the desirable properties of fluorinated polymers and the ease of processability of polyesters. The desirable properties of the fluorinated oxetane polymers are due to the fluorinated side chains and their tendency to be disproportionately present at the air exposed surface when cured. The fluorinated polyoxetane-polyester polymers are cured with an alkyl-modified melamine formaldehyde crosslinker comprising an alkyl etherified melamine formaldehyde resin.

In a second embodiment, a coating can be made with a polyoxetane-free polyester and cured in a multistage process. Specifically, the coating comprises a polyester which is cured using an alkyl-modified melamine formaldehyde crosslinking agent such as alkyl-etherified melamine formaldehyde. These polyoxetane-free compositions have a good balance of properties and are suitable for coating thermoformable substrates.

Thermoformable sheet substrates such as poly(vinyl chloride) (PVC) are used with polymeric coated surfaces comprising crosslinked polymers to provide hard surfaces exhibiting considerably increased durability. In the past, coating integrity and hardness were achieved with various types of crosslinked polymers forming a thermoset polymer network, which worked well with flat surfaces but which had limited extensibility and elasticity and, consequently, could not be thermoformed into contours and configurations without integrity failure (e.g., cracking). Hence, providing a crosslinked coating system for coating thermoformable sheet substrates (e.g., PVC) with sufficient coating integrity and extensibility to adhere while exhibiting sufficient flexibility to maintain coating integrity during subsequent thermoforming process remains desirable.

Melamine-crosslinked polyester coatings are used in low and high pressure laminates having flat surfaces. High pressure laminates typically consist of a multi-layer paper impregnated with melamine-based coatings, where the impregnated laminate is cured at relatively high temperature and pressure to produce a finished article having a hard and durable surface. Examples of this approach include a plasticized PVC layer having a surface coating that includes (i) a reactive carboxyl-functional polyester crosslinked with alkylated benzoguanamine, urea or melamine formaldehyde resin or (ii) a water-based polyester crosslinked with an acid-catalyzed amino resin.

Oxetane polymers with pendent fluorinated chains have low surface energy, high hydrophobicity, oleophobicity and a low coefficient of friction. Various oxetane monomers and polymers are described in, e.g., U.S. Pat. Nos. 5,650,483; 5,468,841; 5,654,450; 5,663,289; 5,668,250; and 5,668,251, and the interested reader is directed to these for more information.

SUMMARY OF THE INVENTION

A coating having desirable properties for many applications can be provided from a composition that includes a polyester and a melamine formaldehyde, more specifically a polyester reacted with an alkyl-etherified melamine formaldehyde which can have one or more lower (e.g., $C_1$-$C_6$) alkyl groups or etherified substituents such as methylol or butylol groups. The composition is partially cured so as to yield a non-tacky surface and subsequently more fully cured into a thermoformed, contoured surface. This two-step curing process includes a low temperature stage in which a partially cured thermoformable polymeric coating layer is applied to a substrate so as to form a laminate followed by a second higher temperature stage in which the laminate is thermoformed into a desired (e.g., three dimensional) configuration during which the alkyl-etherified melamine formaldehyde/polyester mixture is more fully cured and crosslinked so as to form a hard surface coating.

The polyester can be modified with a fluorinated polyoxetane. This type of modified polyester can be used in the same manner as just described so as to provide a composition from which useful coatings can be made in a two-stage curing process. The fluorinated polyoxetane-modified polyester can contain minor amounts of hydroxy-terminated polyoxetane copolymerized polyester reactants to provide a polyester containing from about 0.1 to about 10% by weight copolymerized-fluorinated polyoxetane in the fluorinated polyoxetane-polyester.

DETAILED DESCRIPTION

The present composition, which includes an alkyl-etherified melamine formaldehyde and a reactive polyester (optionally fluorinated polyoxetane-modified), can provide a thermoformable coating when partially cured and a thermoformed, contoured coating when fully cured.

The thermoformable coating can be applied to, e.g., thermoformable substrates. Examples of useful substrates that can be coated include cellulosic products (e.g., coated and uncoated paper), fibers and synthetic polymers including PVC, polyester, olefin (co)polymers, polyvinyl acetate, and poly(meth)acrylates and similar thermoformable flexible, semi-rigid, or rigid substrates. Substrates can be used with or without backings and, if desired, can be printed, embossed, or otherwise decorated. Substrates also can have applied thereto one or more intermediate coating(s) to provide a mono- or multi-chromatic or printed (patterned) background. Also, the substrate film or layer can be smooth or can be embossed to provide a pattern or design for aesthetic or functional purposes.

A thermoformed coated plastic substrate can be applied to a preformed, contoured (i.e., three dimensional) solid structure or article, such as wood, to form a laminated article of a high draw or contoured article. Exemplary articles include contoured cabinet doors, decorative formed peripheral edges on flat table tops, and similar contoured furniture configurations, as well as table tops and side panels, desks, chairs, counter tops, cabinet drawers, hand rails, moldings, window frames, door panels, and electronic cabinets such as media centers, speakers, and the like.

The cured coatings retain their integrity free of undesirable cracking. They also exhibit improved extensibility during the thermoforming step and have significantly improved durability, chemical resistance, stain resistance, scratch resistance, water stain resistance, and similar mar resistance characteristics. They also provide good surface gloss control to the final laminated product.

The two stage temperature curing process is largely dependent on the softening point of the thermoformable substrate. A wet coating is applied to a substrate (e.g., plastic) and dried to form a composite of dried coating on the substrate. The composite is partially cured at relatively low temperatures to form a thermoformable laminate of partially cured coating adhered to the substrate. The first stage partial curing temperatures are at web temperatures of no more than about 82° C. (180° F.), desirably between about 49° and about 77° C. (120°-170° F.), and preferably between about 66° and about 71° C. (150°-160° F.). Dwell time is broadly between about 2 and about 60 seconds, preferably between about 10 and about 20 seconds, depending on the partial curing temperature. The first stage partial curing provides a thermoformable polymeric coating while avoiding thermo-setting crosslinking. The thermoformable laminate can be thermoformed into a desired contour or shape. The intermediate thermoformable coating is advantageously extensible and preferably exhibits at least about 150% elongation at 82° C. (180° F.) after the first curing step. Generally, the first partial curing is about 70 to about 80% of the full cure of a fully cured coating. The resulting thermoformable laminate is non-tacky, avoids blocking or adhesion between adjacent surface layers when rolled or stacked in sheets, and further avoids deformation due to accumulated weight during rolling or stacking.

In the second stage, the thermoformable laminate can be applied to the surface(s) of a three dimensional article or structural form with established contours, draws, or configurations and fully cured at web temperatures of at least 83° C. (181° F.), preferably from about 88° to about 149° C. (190°-300° F.), to provide a hard, fully cured, crack-free, mar resistant coating. Dwell time is broadly between about 30 and about 300 seconds depending on the curing temperature. Cured coatings exhibit MEK resistance of at least about 50 rubs and preferably at least about 75 rubs. Two stage, step-wise curing can be achieved in two or more multiple heating steps to provide, sequentially, partial curing and full curing. Preferably, the final products are articles of furniture such as cabinets, desks, chairs, tables, molding, shelves, doors, or housings such as for appliances, or electronic components. The contoured structural article can be a solid substrate, such as an unfinished contoured desktop where the thermoformable laminate is contoured, thermoset, and adhered directly to the contoured solid article. Alternatively, the form can be a mold for forming a free standing thermoset contoured laminate adapted to be adhered subsequently to an unfinished contoured article. The fully cured surface exhibits considerable mar resistance along with other cured film integrity properties.

Returning to the composition from which the coating is derived, modified amino resins comprising a lower alkyl-etherified melamine formaldehyde are utilized to crosslink the polyester, regardless of whether the latter is fluorinated polyoxetane modified. The melamine formaldehyde resin is generally etherified with one or more groups derived from an alkyl alcohol. Preferred alkyl etherified melamine formaldehyde resins comprise mixed alkyl groups in the same melamine formaldehyde molecule. Mixed alkyl groups comprise at least two different $C_1$-$C_6$ (preferably $C_1$-$C_4$) alkyl groups, for example, methyl and butyl. Preferred mixed alkyl groups comprise at least two alkyl chains having a differential of at least 2-carbon atoms such as methyl and propyl, and preferably a 3-carbon atom differential such as methyl and butyl.

Melamine formaldehyde molecules ordinarily involve a melamine alkylated with at least three, more typically with four or five and most typically with six, formaldehyde molecules to yield methanol groups, e.g., hexamethylolmelamine. At least two, desirably three or four, and preferably five or six of the methanol groups are etherified. A melamine formaldehyde molecule can contain mixed alkyl chains etherified along with one or more non-etherified methanol groups (known as methylol groups), although fully etherified groups are preferred to provide essentially six etherified alkyl groups. Some of the melamine formaldehyde molecules in a melamine formaldehyde can be non-alkylated with formaldehyde (i.e., iminom radicals), but preferably this is controlled to avoid undesirable rapid premature curing and to maintain the controlled two-stage crosslinking as described above.

Mixed alkyl etherified melamine formaldehyde crosslinking resins can be produced in much the same way as conventional mono-alkyl etherified melamine formaldehyde is produced where subsequently all or most methylol groups are etherified, such as in hexamethyoxymethylmelamine (HMMM). A mixed alkyl etherified melamine formaldehyde can be produced by step-wise addition of two different lower alkyl alcohols or by simultaneous coetherification of both alcohols, with step-wise etherification being preferred. Typically lesser equivalents of the first etherified alcohol relative to the available methylol equivalents of melamine formaldehyde are utilized first to assure deficient reaction of alkyl alcohol with available formaldehyde groups, while excess equivalents of the second alcohol are reacted relative to remaining equivalents of formaldehyde to enable full or nearly full etherification with both alcohols. In either or both alcohol etherification steps, reaction water can be removed by distillation, or by vacuum if necessary, to assure the extent of coetherification desired.

A preferred commercially available amino crosslinker is Resimene™ CE-7103 resin (Solutia Inc.; St. Louis, Mo.) which is a mixed methyl and butyl alcohol etherified with melamine formaldehyde. This preferred alkyl-etherified melamine formaldehyde exhibits temperature sensitive curing where reactivity is in two stages to provide a partially cured thermoformable laminate which can be more fully cured at higher temperatures so as to provide a hard surface.

A fluorinated polyoxetane-polyester generally is a block copolymer containing a preformed fluorine-modified polyoxetane having terminal hydroxyl groups. Hydroxyl-terminated polyoxetane prepolymers comprise polymerized repeat units of an oxetane monomer having a pendent —CH$_2$O(CH$_2$)$_n$Rf group prepared from the polymerization of oxetane monomer with fluorinated side chains. These polyoxetanes can be prepared as described in the previously mentioned patents.

The oxetane monomer desirably has the structure

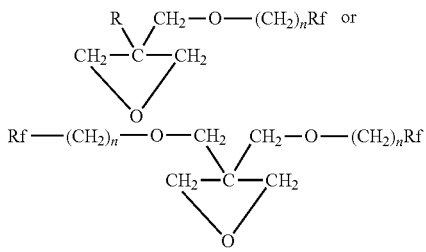

wherein n is an integer of from 1 to 5, preferably from 1 to 3; Rf independently is a linear or branched, preferably saturated, alkyl group of from 1 to about 20, preferably 2 to about 10, carbon atoms with at least 25, 50, 75, 85, 95, or preferably 100% having the H atoms of the Rf replaced by F; and R is H or C$_1$-C$_6$ alkyl group. The polyoxetane prepolymer can be an oligomer or a homo- or co-polymer.

The repeating units derived from the oxetane monomers desirably have the structure

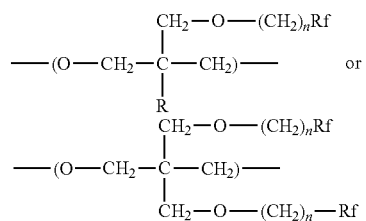

where n, Rf, and R are as described above. The degree of polymerization of the fluorinated oxetane can be from 6 to 100, advantageously from 10 to 50, and preferably 15 to 25.

A hydroxyl-terminated polyoxetane prepolymer comprising repeat units of copolymerized oxetane monomers ordinarily have two terminal hydroxyl groups. Useful polyoxetanes desirably have a number average molecular weight ($M_n$) of from about 100 to about 100,000, preferably from about 250 to about 50,000, and more preferably from about 500 to about 5000, and can be a homo- or co-polymer of two or more different oxetanes. The polyoxetane prepolymer may be a copolymer including very minor amounts of non-fluorinated C$_2$-C$_4$ cyclic ether molecules such as tetrahydrofuran (THF) and one or more oxetane monomers. Such a copolymer may also include very minor amounts of copolymerizable substituted cyclic ethers such as substituted THF. In some embodiments, the hydroxyl-terminated polyoxetane prepolymer can include up to 10%, advantageously from 1 to 5%, and preferably from 2 to 3% copolymerized THF based on the weight of the preformed hydroxyl terminated polyoxetane copolymer. A preferred polyoxetane prepolymer contains two terminal hydroxyl groups to be chemically reacted and bound into the polyoxetane-polyester polymer.

Fluorinated polyoxetane-polyester polymers can be made by a condensation reaction, usually with heat in the presence of a catalyst, of the preformed fluorinated polyoxetane with a mixture of at least one dicarboxylic acid or anhydride and a dihydric alcohol. The resulting fluorinated polyoxetane-polyester is a statistical polymer and may contain active H atoms, e.g., terminal carboxylic acid and/or hydroxyl groups for reaction with the alkyl-etherified melamine formaldehyde crosslinking resin. The ester forming reaction temperatures generally range from about 110° to about 275° C., and desirably from about 215° to about 250° C., in the presence of suitable catalysts such as 0.1% dibutyl tin oxide. Those wishing further details on and examples of the formation of such (co)polymers are directed to, e.g., U.S. Pat. No. 6,383,651 and PCT publication WO 02/34848.

Preferred carboxylic acid reactants are dicarboxylic acids and anhydrides. Examples of useful dicarboxylic acids include adipic acid, azelaic acid, sebacic acid, cyclohexanedioic acid, succinic acid, terephthalic acid, isophthalic acid, phthalic anhydride and acid, and similar aliphatic and aromatic dicarboxylic acids. A preferred aliphatic dicarboxylic acid is adipic acid and a preferred dicarboxylic aromatic acid is isophthalic acid. Generally, the aliphatic carboxylic acids have from about 3 to about 10 C atoms, while aromatic carboxylic acids generally have from about 8 to about 30, preferably from 10 to 25, C atoms.

Useful polyhydric alcohols generally have from about 2 to about 20 carbon atoms and 2 or more hydroxyl groups, with diols being preferred. Examples of useful polyols, include ethylene glycol, propylene glycol, diethylene glycol, dipropylene glycol, glycerin, butylene glycol, higher alkyl glycols such as neopentyl glycol, 2,2-dimethyl-1,3-propanediol, trimethylol propane, 1,4-cyclo-hexanedimethanol, glycerol pentaerythritol, trimethylolethane. Mixtures of polyols and polycarboxylic acids can be used where diols and dicarboxylic acids dominate and higher functionality polyols and polyacids are minimized. An example of a preferred reactive polyester is the condensation product of trimethylol propane, 2,2-dimethyl-1,3-propanediol, 1,4-cyclohexanedimethanol, isophthalic acid or phthalic anhydride, and adipic acid.

The polyester component can be formed by reacting the ester-forming reactants in the presence of a preformed intermediate fluorinated polyoxetane oligomer, polymer, or copolymer to provide an ester linkage derived from esterifying a dicarboxylic acid or anhydride with the preformed polyoxetane. Alternatively, a preformed polyester intermediate can be formed from diols and dicarboxylic acids and reacted with the preformed fluorinated polyoxetane oligomer or (co) polymer to form the ester linkage between the respective preformed components. Thus, block copolymers are generally formed.

In preparing the hydroxyl- or carboxyl-functional polyoxetane-polyester polymer, it is preferred to pre-react the hydroxyl-terminated fluorinated polyoxetane oligomer or (co)polymer with dicarboxylic acid or anhydride to assure copolymerizing the fluorinated polyoxetane prepolymer into polyester via an ester linkage which increases the percentage of fluorinated polyoxetane prepolymer incorporated. A preferred process to form the ester linkage comprises reacting the hydroxyl terminated fluorinated polyoxetane prepolymer with excess equivalents of carboxylic acid from a linear C$_3$-C$_{30}$ dicarboxylic acid such as malonic acid, succinic acid, glutaric acid, adipic acid, pimelic acid, maleic acid, fumaric acid, or cyclic cyclohexanedioic acid, under conditions effective to form a poly-oxetane ester intermediate from the hydroxyl groups of the polyoxetane prepolymer and the carboxylic acid groups of the dicarboxylic acid or anhydride. More desirably, the excess of carboxylic acid groups is at least 2.05 or 2.1 equivalents reacted with one equivalent of hydroxy-terminated polyoxetane prepolymer to provide a predominantly carboxyl-terminated intermediate prepolymer. In a preferred embodiment for producing the ester intermediate prepolymer, the amount of other diols is small to force the carboxylic acid groups to react with the hydroxyl groups of the fluorinated polyoxetane prepolymer. Desirably, the equivalents of hydroxyls from other diols are less than 0.5, more desirably less than 0.2 and preferably less than 0.1 per equivalent of hydroxyls from the fluorinated polyoxetane prepolymer until after at least 70, 80, 90, or 95% of the hydroxyl groups of the polyoxetane prepolymer are converted to ester links by reaction with the dicarboxylic acid.

The reaction temperature is generally from about 110° to about 275° C. and desirably from about 215° to about 250° C.

The preferred carboxylic acid functional polyoxetane intermediate then can be reacted with other diol and dicarboxylic acid reactants to form the polyoxetane-polyester polymer. Although excess hydroxyl or carboxyl equivalents can be utilized to produce either hydroxyl- or carboxyl-functional polyoxetane-polyester, preferably excess hydroxyl equivalents are copolymerized to provide a hydroxyl terminated polyoxetane-polyester. Polyoxetane repeating units are usually disproportionately present at the surface of the coating due to the low surface tension of those units.

While not as desirable, an alternative route of reacting the hydroxyl-terminated fluorinated polyoxetane oligomer or (co)polymer is directly with a preformed polyester. In this procedure, the various polyester forming diols and dicarboxylic acids are first reacted to form a polyester block which then is reacted with a polyoxetane prepolymer.

The amount of fluorinated polyoxetane copolymerized in the polyoxetane-polyester is desirably from about 0.1 to about 10%, advantageously from about 0.5 to about 5%, and preferably from 0.5 to about 3% by weight based on the weight of the fluorinated polyoxetane-polyester. If the hydroxyl terminated poly-oxetane prepolymer includes a significant amount of copolymerized comonomer repeat units from THF or other cyclic ether, the hydroxyl terminated polyoxetane prepolymer weight can exceed the level of copolymerized oxetane repeating units noted immediately above by the amount of other copolymerized cyclic ether other than oxetane used to form the polyoxetane copolymer.

The polyester as described above can contain relatively small amounts, or be substantially or completely free, of any fluorinated polyoxetane block. The amount of fluorinated polyoxetane therein is generally less than about 2 or about 1% by weight, desirably less than about 0.5 or about 0.1% by weight, and preferably completely free of any fluorinated polyoxetane based upon the total weight of the polyester. The polyesters which are utilized are the same as set forth hereinabove and are made in the same manner.

A preferred polyester resin is supplied by Eastman Chemical Co. (Kingsport, Tenn.) under the trade designation Polymac™ 57-5776, which is an oil free polyester polyol having an equivalent weight of about 315 and a hydroxyl number of about 178. Such polyesters generally have a $M_n$ of from about 300 to about 25,000, desirably from about 500 to about 12,000, preferably from about 750 to about 5,000, and more preferably from about 1500 to about 2500.

The amount of the various components in the coating will be generally specified in relationship to 100% by weight of resin solids of the polyoxetane-polyester or of the polyester resin polymer and the alkyl etherified melamine formaldehyde. The weight percent of alkyl etherified melamine formaldehyde crosslinking agent in the coating is at least 10%, desirably from about 10 to about 80%, preferably from about 20 to about 70% and most preferably from about 40 to about 60% by weight of the resin binder solids of the coating composition, with the balance being fluorinated polyoxetane-polyester polymer or in the second embodiment the polyester polymer.

The crosslinking reaction can be catalyzed with, for example, para-toluene sulfonic acid (PTSA) or methyl sulfonic acid (MSA). Other useful acid catalysts include boric acid, phosphoric acid, sulfate acid, hypochlorides, oxalic acid and ammonium salts thereof, sodium or barium ethyl sulfates, sulfonic acids, and the like. Other potentially useful catalysts include dodecyl benzene sulfonic acid (DDBSA), amine-blocked alkane sulfonic acid such as MCAT 12195 catalyst (ATOFINA Chemicals, Inc.; Philadelphia, Pa.), amine-blocked dodecyl para-toluene sulfonic acid such BYK 460 catalyst (BYK-Chemie USA; Wallingford, Conn.), and amine-blocked dodecyl benezene sulfonic acid such as Nacure™ 5543 catalyst (King Industries, Inc.; Norwalk, Conn.). Ordinarily from about 1 to about 15% and preferably about 3 to about 10% acid catalyst is used based on alkyl-etherified melamine formaldehyde and polyester resin used.

The amount of catalyst should effectively catalyze the partial curing of the polyester and alkyl-etherified melamine formaldehyde resins in the two stages.

The amount of carriers and/or solvent(s) in the coating composition can vary widely depending on the coating viscosity desired for application purposes, and solubility of the components in the solvent. The solvent(s) can be any conventional solvent for polyester and melamine formaldehyde crosslinker resin systems. These carriers and/or solvents include $C_3$-$C_{15}$ ketones, e.g., MEK or methyl isobutyl ketone; $C_3$-$C_{20}$ alkylene glycols and/or alkylene glycol alkyl ethers; acetates (including n-butyl and n-propylacetates) and their derivatives; ethylene carbonate; etc. Suitable alcohol solvents include $C_1$-$C_8$ monoalcohols such as methyl, ethyl, propyl, butyl alcohols, as well as cyclic alcohols such as cyclohexanol. More information on such carrier and/or solvent systems can be found in, e.g., U.S. Pat. Nos. 4,603,074; 4,478,907; 4,888,381 and 5,374,691. The amount of solvent(s) can vary from about 20 to about 400 parts by weight (pbw) per 100 pbw of total polyester and etherified melamine formaldehyde crosslinker resin solids.

Conventional flattening agents can be used in the coating composition in conventional amounts to control the gloss of the coating surface to an acceptable value. Examples of conventional flattening agents include the various waxes, silicas, aluminum oxide, alpha silica carbide, etc. Amounts desirably vary from about 0 to about 10, preferably from about 0.1 to about 5, pbw per 100 pbw total of resin solids.

Additionally, other conventional additives can be formulated into the coating composition for particular applications. For example, polysiloxanes can be used to improve scratch and mar resistance. This may be particularly advantageous where the polyester is not modified with a fluorinated polyoxetane. In particular, a suitable polysiloxane can be polyether-modified alkyl polysiloxane including, for example, BYK™ 33 polyether-modified dimethylpolysiloxane copolymer (BYK-Chemie USA). Other examples of additives include viscosity modifiers, antioxidants, antiozonants, processing aids, pigments, fillers, ultraviolet light absorbers, adhesion promoters, emulsifiers, dispersants, solvents, crosslinking agents, and the like.

EXAMPLES

Example 1

Synthesis of Fluorinated Polyoxetane-Polyester Polymers

Two hydroxyl-terminated fluorinated polyoxetanes were used to prepare different polyoxetane-polyester polymers.

The first polyoxetane had 6 mole percent repeating units from THF with the rest of the polymer being initiator fragment and repeating units from 3-(2,2,2-trifluoroethoxylmethyl)-3-methyloxetane, i.e., 3-FOX (n=1, Rf=CF$_3$, and R=CH$_3$ in the formulas above) and had a M$_n$ of 3400. The second polyoxetane had 26 mole percent repeating units from THF with the residual being the initiator fragment and repeating units from 3-FOX.

The first and second fluorinated oxetane polymers were reacted with at least a 2 (generally 2.05-2.10) equivalent excess of adipic acid in a reactor at 235° C. for 3.5 hours to form a polyoxetane having the half ester of adipic acid as carboxyl end groups. (The preformed ester linkage and terminal carboxyl groups were used to bond the polyoxetane to a subsequently in situ-formed polyester.) NMR analysis was used to confirm that substantially all the hydroxyl groups on the polyoxetane were converted to ester groups. The average degree of polymerization of the first oxetane polymer was reduced from 18 to 14 during the reaction with adipic acid. The average degree of polymerizations of the second oxetane polymer remained at 18 throughout the reaction. The reactants were then cooled to about 149° C.

The adipic acid-functionalized polyoxetane was reacted with additional diacids and diols to form polyester blocks. The diacids were used in amounts of 24.2 pbw adipic acid and 24.5 pbw isophthalic acid or phthalate anhydride. The diols were used in amounts of 20.5 pbw cyclohexanedimethanol, 14.8 pbw neopentyl glycol, and 16.0 pbw trimethylol propane. The relative amounts of the adipate ester of the oxetane polymer and the polyester-forming components were adjusted to result in polyoxetane-polyesters with either 2 or 4 weight percent of partially fluorinated oxetane repeating units. The diacid and diol reactants were reacted in the same reactor used to form the carboxyl-functional polyoxetane but the reaction temperature was lowered to about 216° C. The reaction to form the polyoxetane-polyester polymer was continued until the calculated amount of water was generated.

Example 2

Preparation and Testing of Coated Laminate Using a Fluorinated Polyoxetane-Modified Polyester The following ingredients were mixed and allowed to react:

| | |
|---|---|
| Resimene ™ CE-7103 methyl/butyl-etherified melamine formaldehyde resin | 31.4 pph |
| poly-5-FOX/polyester | 31.4 pph |
| n-propyl acetate | 20.7 pph |
| THF | 3.5 pph |
| isopropyl alcohol | 6.0 pph |
| p-toluene sulfonic acid | 4.0 pph |
| BYK ™-333 polyether-modified dimethylpolysiloxane copolymer | 0.7 pph |
| Acematt ™ TS100 fumed silica (Degussa Corp.; Fairlawn, Ohio) | 1.4 pph |
| Polyfluo ™ 190 fluorocarbon wax (Micro Powders, Inc.; Tarrytown, New York) | 0.9 pph |

The poly-5-FOX/polyester polymer was made from a 5-FOX polymer (made similarly to the 3-FOX polymer described in Example 1) reacted with adipic acid to form an ester linkage having a terminal carboxyl group and, subsequently, with ester-forming monomers in a manner substantially as set forth in Example 1 (with the acids being adipic acid and phthalate anhydride). Polyether-modified dimethylpolysiloxane copolymer and fluorocarbon wax were added to improve scratch and mar resistance, and fumed silica was added to control gloss.

Coatings were applied by gravure coating to 0.0305 cm (0.012 inch) thick PVC substrate sheets having a lightly embossed surface (E13 embossing). The resulting coated samples were dried in a forced air oven and partially cured at about 66° to 71° C. (150°-160° F.) for 10 to 20 seconds to form partially cured thermoformable laminates. Coating weights were 6-8 g/m$^2$ of substrate.

The laminates were thermoformed to MDF wood board using a membrane press. Coated PVC and laminate sequentially are placed over a MDF board. The membrane was heated to about 138° C. before being pulled tightly around the PVC film and MDF board by vacuum (thermoforming). (The maximum surface temperature of the PVC can be measured and recorded with a temperature indicating tape.) Heat was maintained for about a minute before being removed, and the membrane allowed to cool for 1 minute while vacuum was maintained.

The following test procedures were used to measure coating properties:
Scratch Resistance:
  Measured with a "Balance Beam Scrape Adhesion and Mar Tester" (Paul N. Gardner Co., Inc.; Pompano Beach, Fla.). A Hoffman stylus was used to scratch the coatings. Scratch resistance is the highest stylus load the coating can withstand without scratching.
Burnish Mar:
  Determined by firmly rubbing a polished porcelain pestle on the coating surface. The severity of a mark is visually assessed as:
    Severe—mark visible at all angles
    Moderate—mark visible at some angles
    Slight—mark visible only at grazing angles
    None—no perceivable mark
Solvent Resistance:
  A cloth towel was soaked with MEK and gently rubbed on the coated surface in a back and forth manner, with one back-and-forth movement counting as one rub. The coated surface was rubbed until the sooner of a break in the coating surface first becoming visible or 100 rubs.
Coating Crack:
  Corners and edges were visually inspected for cracks in the coating.
Cleanability/Stain:
  Measured by common household substances published by NEMA Standards Publications LD-3 for High Pressure Decorative Laminates. The method consists of placing a spot of each test reagent on a flat surface of the laminated article and allowed to sit undisturbed for 16 hours. At that time, the stains were cleaned with different stain removers that are commonly used as commercial cleaners (e.g., Formula 409™, Fantastik™, etc.), baking soda, nail polish remover, and finally bleach. Depending on the difficulty (high values) or ease (low values) of removal, the total value from each test sample was determined.

| | Grade |
|---|---|
| water | 0 |
| commercial cleaner | 1 |
| commercial cleaner + baking soda | 2 |
| nail polish remover | 3 |
| 5.0% solution of sodium hypochlorite (bleach) | 4 |

TABLE 1

Durability Testing

|  | Coated and Fully Cured | Coated and Partially Cured | Uncoated |
|---|---|---|---|
| Hoffman Scratch | 2050 g | 1850 g | 1000 g |
| Burnish Mar | Slight | Slight | Moderate |
| Solvent resistance | 90 rubs | 60 rubs | 4 rubs |
| Coating crack | None | None | None |

The results of Table 1 indicate that the coated samples exhibit significantly greater Hoffman scratch and burnish mar resistances than uncoated PVC, and the fully cured (thermoformed) sample had better resistance than the non-fully cured sample. Similarly, the burnish resistances of the thermoformed and coated samples were greater than that of the uncoated PVC.

Stain remover values as described above were used in a progressive intensity stain-removing test scale. A "1" in the test result set forth in Tables 2a-2c indicates the stain was not removed until a stronger stain remover was used.

TABLE 2a

NEMA Stain Test Results (Coated + Fully Cured)

| | Cleaning Reagents | | | | | | |
|---|---|---|---|---|---|---|---|
| | 1 | 2 | 3 | 4 | 5 | Score | Stain |
| acetone | 1 | 1 | 1 | 1 | 1 | 5 | Moderate |
| coffee | | | | | | — | |
| tea | 1 | | | | | 1 | |
| mustard | 1 | 1 | 1 | | | 3 | |
| 10% iodine | 1 | | | | | 1 | |
| permanent marker | 1 | 1 | 1 | | | 3 | |
| #2 pencil | 1 | | | | | 1 | |
| wax crayon | 1 | | | | | 1 | |
| shoe polish | 1 | | | | | 1 | |
| | | | | | Total | 16 | |

TABLE 2b

NEMA Stain Test Results (Coated and Partially Cured)

| | Cleaning Reagents | | | | | | |
|---|---|---|---|---|---|---|---|
| | 1 | 2 | 3 | 4 | 5 | Score | Stain |
| acetone | 1 | 1 | 1 | 1 | 1 | 5 | Moderate |
| coffee | | | | | | — | |
| tea | 1 | | | | | 1 | |
| mustard | 1 | 1 | | | | 2 | |
| 10% iodine | | | | | | — | |
| permanent marker | 1 | 1 | 1 | | | 3 | |
| #2 pencil | 1 | | | | | 1 | |
| wax crayon | 1 | | | | | 1 | |
| shoe polish | 1 | | | | | 1 | |
| | | | | | Total | 14 | |

TABLE 2c

NEMA Stain Test Results (Uncoated PVC)

| | Cleaning Reagents | | | | | | |
|---|---|---|---|---|---|---|---|
| | 1 | 2 | 3 | 4 | 5 | Score | Stain |
| acetone | 1 | 1 | 1 | 1 | 1 | 5 | Moderate |
| coffee | 1 | 1 | | | | 2 | |

TABLE 2c-continued

NEMA Stain Test Results (Uncoated PVC)

| | Cleaning Reagents | | | | | | |
|---|---|---|---|---|---|---|---|
| | 1 | 2 | 3 | 4 | 5 | Score | Stain |
| tea | | | | | | — | |
| mustard | 1 | 1 | 1 | | | 3 | |
| 10% iodine | 1 | | | | | 1 | |
| permanent marker | 1 | 1 | 1 | 1 | 1 | 5 | Moderate |
| #2 pencil | 1 | 1 | | | | 2 | |
| wax crayon | 1 | 1 | | | | 2 | |
| shoe polish | 1 | 1 | 1 | | | 3 | |
| | | | | | Total | 23 | |

Example 3

Preparation and Testing of Coated Laminate Using an Unmodified Polyester

The following ingredients were mixed and allowed to react:

| | |
|---|---|
| Resimene ™ CE-7103 methyl/butyl-etherified melamine formaldehyde resin | 31.4 pph |
| Polymac ™ 57-5776 polyester resin | 31.4 pph |
| n-propyl acetate | 20.7 pph |
| THF | 3.5 pph |
| isopropyl alcohol | 6.0 pph |
| p-toluene sulfonic acid | 4.0 pph |
| BYKT ™-333 polyether-modified dimethylpolysiloxane copolymer | 0.7 pph |
| Acematt ™ TS100 fumed silica | 1.4 pph |
| Polyfluo ™ 190 fluorocarbon wax | 0.9 pph |

As in Example 2, polyether-modified dimethylpolysiloxane copolymer and fluorocarbon wax were added to improve scratch and mar resistance, and fumed silica was added to control gloss.

Coatings were applied with a #5 wire wound drawdown bar to 0.0305 cm (0.012 inch) thick PVC substrate sheets having a lightly embossed surface (E13 embossing). The resulting coated samples were dried in a laboratory oven at about 66° C. (150° F.) for 30 seconds to form partially cured thermoformable laminates.

These laminates were thermoformed in the same manner as in Example 2. Testing was performed as described in Example 2.

TABLE 3

Durability Testing

| Hoffman Scratch | 3000 g |
|---|---|
| Burnish Mar | None |
| Solvent resistance | 80 |
| Coating crack | None |

TABLE 4

NEMA Stain Test Results

| | Cleaning Reagents | | | | | | |
|---|---|---|---|---|---|---|---|
| | 1 | 2 | 3 | 4 | 5 | Score | Stain |
| acetone | 1 | 1 | 1 | 1 | 1 | 5 | Moderate |
| tea | 1 | 1 | | | | 2 | |
| mustard | 1 | 1 | 1 | | | 3 | |
| 10% iodine | 1 | 1 | 1 | | | 3 | |
| permanent marker | 1 | 1 | 1 | | | 3 | |
| #2 pencil | 1 | | | | | 1 | |
| wax crayon | 1 | | | | | 1 | |
| shoe polish | 1 | 1 | | | | 2 | |
| | | | | | Total | 20 | |

Overall, the unmodified polyester sample showed good solvent resistance and durability (scratch and mar), although stain resistance was slightly poorer than the fluorinated polyoxetane-modified polyester sample.

That which is claimed is:

1. A method of providing an article with a thermoformed exterior, outward facing surface, said method comprising:
    a) thermoforming to an exterior surface of said article a composite so as to provide a laminate, said composite comprising a substrate bearing a coating on a surface opposite the side of said substrate contacting said exterior surface of said article; and
    b) heating said laminate to a temperature of at least 83° C. for at least 30 seconds so as to cure said laminate, thereby providing said thermoformed surface,
    said coating being the partially crosslinked product of ingredients that comprise a polyester, an alkyl-etherified melamine formaldehyde compound and, based on the combined weight of the polyester and alkyl-etherified melamine formaldehyde compound from about 1 to about 15% of a thermally activatable catalyst.

2. The method of claim 1 wherein said article is non-planar.

3. The method of claim 2 wherein said non-planar article is a piece of furniture.

4. The method of claim 1 wherein said substrate comprises poly(vinyl chloride).

5. The method of claim 4 wherein said laminate is heated to a temperature of from 88° to 149° C.

6. The method of claim 1 wherein said alkyl-etherified melamine formaldehyde compound comprises the reaction product of a melamine formaldehyde and at least two $C_1$-$C_6$ alkyl alcohols.

7. The method of claim 6 wherein said at least two $C_1$-$C_6$ alkyl alcohols comprise two alcohols having at least a two carbon atom differential in their chain lengths.

8. The method of claim 7 wherein said at least two $C_1$-$C_6$ alkyl alcohols comprise methanol and propyl alcohol.

9. The method of claim 6 wherein said at least two $C_1$-$C_6$ alkyl alcohols comprise three alcohols having at least a two carbon atom differential in their chain lengths.

10. The method of claim 9 wherein said at least two $C_1$-$C_6$ alkyl alcohols comprise methanol and butyl alcohol.

11. The method of claim 1 wherein said melamine formaldehyde of said alkyl-etherified melamine formaldehyde compound comprises at least three methylol groups.

12. The method of claim 11 wherein said melamine formaldehyde of said alkyl-etherified melamine formaldehyde compound comprises at least four methylol groups.

13. The method of claim 12 wherein said melamine formaldehyde of said alkyl-etherified melamine formaldehyde compound comprises at least five methylol groups.

14. The method of claim 13 wherein said melamine formaldehyde of said alkyl-etherified melamine formaldehyde compound comprises six methylol groups.

15. The method of claim 11 wherein at least one of said at least three methylol groups is alkyl etherified.

16. The method of claim 11 wherein each of said at least three methylol groups is alkyl etherified.

17. The method of claim 11 wherein said polyester comprises fluorinated polyoxetane units.

18. The method of claim 17 wherein each of said fluorinated oxetane units comprises a pendent —$CH_2$—O—($CH_2$)$_n$ Rf group where n is an integer of from 1 to 3 inclusive.

* * * * *